March 11, 1941.    A. DIETZEL    2,234,521
METHOD AND APPARATUS FOR PRODUCING GLASS FILAMENTS
Filed Feb. 23, 1939

INVENTOR
Adolf Dietzel
By Watson, Cole, Grindle & Watson
ATTYS

Patented Mar. 11, 1941

2,234,521

UNITED STATES PATENT OFFICE 2,234,521

METHOD AND APPARATUS FOR PRODUCING GLASS FILAMENTS

Adolf Dietzel, Berlin-Zehlendorf, Germany

Application February 23, 1939, Serial No. 258,039
In Germany February 28, 1938

6 Claims. (Cl. 83—91)

This invention relates to a method and apparatus for producing glass filaments.

It is an object of the invention to produce very fine and long glass filaments in large quantities which, more particularly, are suitable for use in a weaving operation.

Another object of the invention is to provide simple and compact apparatus gor producing large quantities of fine glass filaments in an inexpensive, continuous, automatic process.

Still another object of the invention is to avoid the use of heated platinum or like nozzles in the spinning process. A still further object of the invention is to provide means for producing glass filaments of dyed, chemically active and/or high melting glass compositions.

With these and other objects in view, as may become apparent from the within disclosures, the invention consists not only of the structures herein pointed out and illustrated by the drawing, but includes further structures coming within the scope of what hereinafter may be claimed.

The character of the invention, however, may be best understood by reference to one of its structural forms, as illustrated by the accompanying drawing in which—

Figure 1:
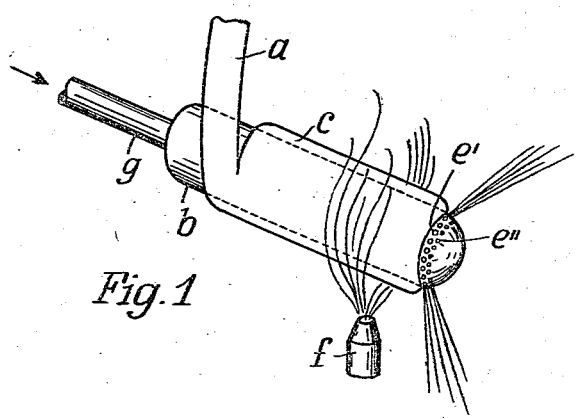
Fig. 1 is a perspective view of an apparatus for carrying out the invention.
Figure 2:
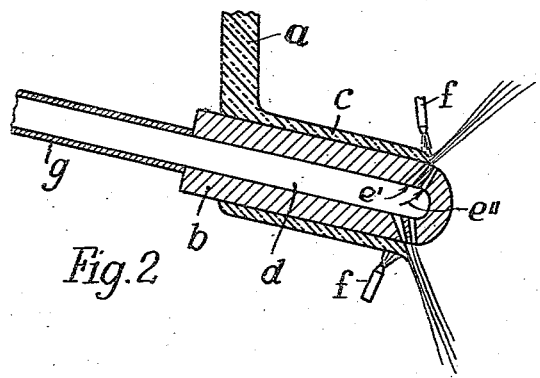
Fig. 2 is an axial section of the same apparatus.
Figure 3:
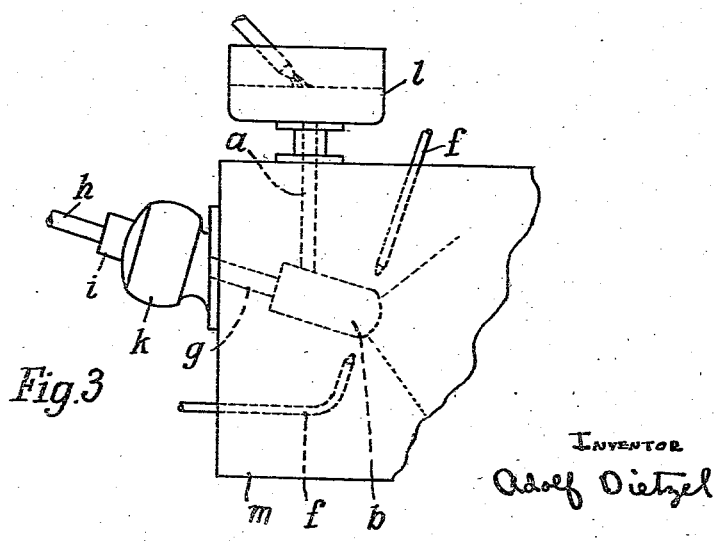
Fig. 3 is a side elevation showing purely schematically my novel apparatus connected to its auxiliary devices.

As here shown, I produce on a carrier surface a foil or layer of liquid glass which advantageously is relatively thin and is blown out by means of gas currents which are preferably finely distributed, whereby thin glass filaments are obtained. The carrier surface is preferably provided in an inclined position with the glass feed at its upper end and the blowing means near or at its lower end. The gas currents are directed substantially perpendicularly to the liquid glass foil.

According to a special feature of the invention, the gas currents or streams pass through apertures or nozzles in the carrier and the gas is fed at the under side of the carrier with respect to the foil. In order to provide a continuous operation, I may feed continuously molten glass or the ingredients therefor from the upper end of the inclined carrier.

As here shown, I proceed practically in this manner, in a preferred form of my method, that the foil of liquid glass is formed and evenly distributed on a slowly rotating cylindrical body forming the carrier for the glass foil and for the nozzles to which the gas is fed through a central bore in the cylindrical body. In this case, it is easily possible, moreover, to heat the glass foil additionally to any desired controllable temperature, prior to, i. e., especially immediately prior to, the blowing action by the gas currents and the heating can be effected from the outside, for example, by gas burners or electric heaters, without direct heat conduction through contact with precious metal surfaces.

It is also contemplated that the glass material may be fed to the carrier surface in the form of its initial materials or ingredients at the upper or rear end of the refractory carrier and blown out to filaments at the lower or front end thereof, in one operation.

One practical form of apparatus for carrying out my novel method comprises a downwardly inclined hollow body in the form of a solid of revolution which rotates about its axis and at its upper end is connected to a compressed gas conduit while the lower end is closed by a vault-shaped or hemispherical portion having nozzles adjacent to its largest diameter, more particularly in a plurality of rows and mutually staggered.

Referring now to the drawing, a hollow cylinder $b$ of a refractory material, such as, chamotte, sillimanite or the like is fixedly connected to an inclined rotary pipe $g$ which is connected to a stationary supply pipe $h$ for compressed gas or air, through a packing system $i$ and mounted for drive by a motor $k$. The lower end of the cylinder $b$ is formed with a curved or hemispherical end portion in which two rows of mutually staggered nozzles $e'$ and $e''$ are provided substantially normal to the surface area at their outlet. Gas burners $f$ are directed towards said end portion.

The operation of this arrangement is as follows: A band or strip $a$ of liquid glass is continuously discharged from a melting vessel or trough indicated purely schematically at $l$, and wound up on the carrier body $b$ which is continuously rotated in the direction indicated by the arrow, whereby a smooth uniform layer or foil of glass $c$ is formed on said carrier which foil is gradually fed towards the nozzles at the lower end of the carrier by combined action of the inclination and the motion of the carrier. The angle of inclination of the carrier and its speed are determined by the viscosity of the glass melt and the thickness of the glass layer. The rate of revolution of the carrier is defined on the one hand by the fact that a uniform and even layer of glass shall be formed on the carrier and that the glass melt must be prevented from flowing off from the carrier or dropping down under action of its own gravity, during its travel from the feeding end to the nozzles and, on the other hand, by the fact that the foil must not be flung off from the carrier by centrifugal action during said travel. The actual speed thus depends on the viscosity of the glass, its temperature and the inclination of the carrier.

As the glass layer c reaches the lower end of the carrier, it is blown apart to thin glass filaments by the gas or air which is fed through the pipe g and the central bore d of the carrier and discharged under pressure through the nozzles e. Any portions of the glass layer passing between the nozzles of the first row e' are blown apart by the staggered nozzles of the second row e". Where the spaces between adjacent nozzles of one row are relatively large, one or more further rows of nozzles may be provided in addition to the two rows e' and e" shown in the drawing.

It will be noted that the said arrangement and method permits any desired accurately controlled additional heating of the glass immediately prior to the spinning by direct heating, for example, by the gas burners f. In this manner, the glass can be heated to any desired elevated temperature while the carrier b assumes a lower temperature and thus is not exposed to undue thermal stresses. This fact is of a special importance where chemically active glass compositions or compositions of a very high melting point shall be spun.

The whole arrangement may be enclosed in a housing or chamber m which at the same time serves to collect the glass filaments that have been produced in the manner described and will fall down on the bottom of the chamber, where they may be drawn off continuously or intermittently in any suitable manner. A wire screen (not shown) may be inserted to collect the glass filaments while allowing any drops of glass to pass through its meshes. The glass filaments may then be drawn off from the screen in the form of a continuous hank.

It will be understood that where larger quantities of glass wool or glass silk are to be produced, a plurality of spinning apparatus of the type described may be fed from a common melting vessel l. On the other hand, it is also contemplated that the melting vessel may be omitted and the ingredients for the glass composition may be fed at the upper end of the carrier b, for example, in the form of a ring and the said ingredients may be melted and refined on the refractory carrier during their travel to the blowing end.

It will thus be understood that my novel method and apparatus permits the mass production of fine glass filaments of any desired composition in an automatic, continuous operation, with any desired melting characteristics. For instance, the glass may be melted and treated in an oxidizing or reducing manner. Thus, it is also possible to spin glass compositions that have been dyed in any desired manner while such compositions could not be spun through platinum nozzles in view of their corrosive action upon platinum due to the presence of sulfides, selenides or larger quantities of heavy metal oxides in such compositions. Also, glass compositions of a high melting point can be spun very well in my novel process and apparatus, since the glass is directly heated in a relatively thin layer. Compared to processes in which the glass filaments are produced by a centrifugal action exerted upon the glass melt, my novel process and apparatus is simpler and the filaments are longer and thinner. Also, the disadvantage of the centrifugal processes regarding the production of many glass drops is eliminated.

I am aware that many changes may be made and numerous details may be varied through a wide range without departing from the principles of this invention and I, therefore, do not purpose limiting the patent granted hereon otherwise than is necessitated by the prior art. It is also understood that, within the scope of the invention, the supporting body for the molten glass may be any suitable elongate body of revolution, and where the term "substantially cylindrical" occurs, it shall not preclude the use of such a body with a tapered or conical surface.

I claim:

1. In an apparatus for producing glass filaments, a carrier body in the form of an elongate solid of revolution mounted in an inclined position for rotation about its axis, means for feeding a glass melt upon the carrier adjacent its upper end, means for slowly rotating said carrier whereby, in conjunction with the action of the force of gravity, a uniformly thin tubular stream of molten glass is formed thereon, a plurality of fine conduits adjacent the lower end of said carrier and having open ends directed radially of said carrier, and means for supplying pressure fluid to said conduits whereby the lower end of said stream of glass is blown into filaments.

2. In an apparatus for producing glass filaments, a carrier body in the form of an elongate solid of revolution mounted in an inclined position for rotation about its axis, means for feeding a glass melt upon the carrier adjacent its upper end, means for slowly rotating said carrier whereby, in conjunction with the action of the force of gravity, a uniformly thin tubular stream of molten glass is formed thereon, a plurality of fine conduits adjacent the lower end of said carrier and having open ends directed radially outwardly of the axis of said carrier, means for supplying pressure fluid to said conduits whereby the lower end of said stream of glass is blown into filaments, and heating means applied to said hollow stream immediately in advance of the point of impingement of the jets of pressure fluid from said conduits upon the stream.

3. In an apparatus for producing glass filaments, a hollow carrier body in the form of an elongate solid of revolution having a smooth unbroken outer surface and mounted in an inclined position for rotation about its axis, a source of gas under pressure connected with the upper end of said carrier, means for feeding a glass melt upon the carrier adjacent its upper end, means for slowly rotating said carrier whereby, in conjunction with the action of the force of gravity, a uniformly thin tubular stream of glass is formed thereon, said hollow carrier having a plurality of fine orifices extending radially therethrough adjacent the lower end thereof, opening directly onto said smooth outer surface, and adapted to blow said thin stream of molten glass into filaments.

4. In an apparatus for producing glass filaments, a hollow carrier body in the form of an elongate solid of revolution having a smooth unbroken outer surface and mounted in an inclined position for rotation about its axis, a source of gas under pressure connected with the upper end of said carrier, means for feeding a glass melt upon the carrier adjacent its upper end, means for slowly rotating said carrier whereby, in conjunction with the action of the force of gravity, a uniformly thin tubular stream of glass is formed thereon, said hollow carrier having a dome-shaped lower end on said carrier, a plurality of annular series of fine radial passageways extending through said hollow carrier adjacent the base of the dome-shaped end thereof and opening directly onto said smooth outer surface, the passageways in adjacent series being staggered.

5. In a process for the continuous production of fine glass filaments suitable for weaving into fabrics, the steps of flowing a molten glass composition into the form of a uniformly thin substantially cylindrical stream, interiorly supporting said stream with its axis inclined to the vertical, rotating said stream about its axis in order to maintain said substantially uniform thin stream, and directing a multiplicity of fine jets of gas under pressure against said stream adjacent its lowermost end, radially outwardly from within said stream, and with sufficient velocity to divide said lower end of the molten stream into filaments.

6. In a process for the continuous production of fine glass filaments suitable for weaving into fabrics, the steps of flowing a molten glass composition into the form of a uniformly thin substantially cylindrical stream, interiorly supporting said stream with its axis inclined to the vertical, slowly rotating said stream about its axis in order to maintain said substantially uniform thin stream, applying heat directly to the lower portion of said stream, and directing a multiplicity of fine jets of gas under pressure against said stream adjacent its lowermost end, radially outwardly from within said stream, and with sufficient velocity to divide said lower end of the molten stream into filaments.

ADOLF DIETZEL.